J. A. JERNSTEDT.
WATER METER.
APPLICATION FILED FEB. 18, 1916.
1,201,303.
Patented Oct. 17, 1916.
2 SHEETS—SHEET 1.
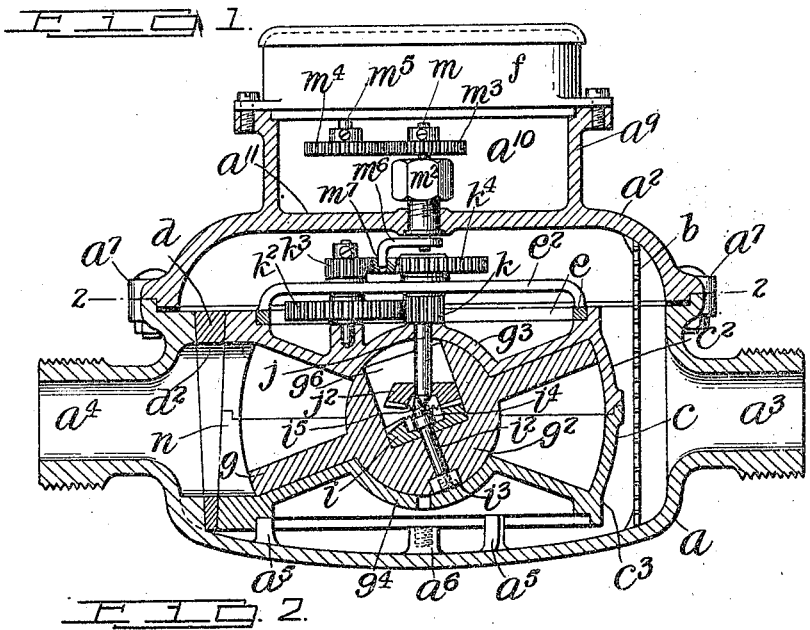
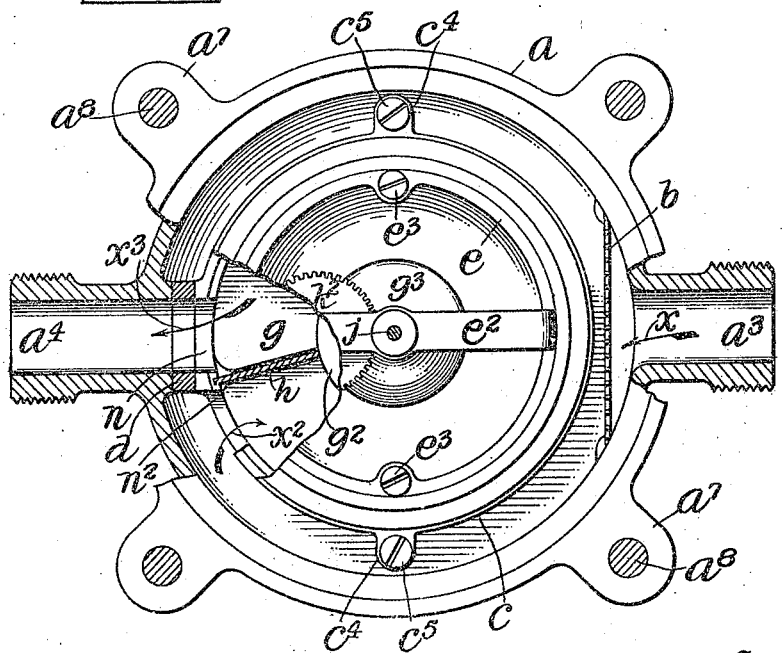
Witnesses:
W. E. Thompson
C. Mudreany
Inventor
James A. Jernstedt,
By his Attorneys
Edgar Tate & Co.

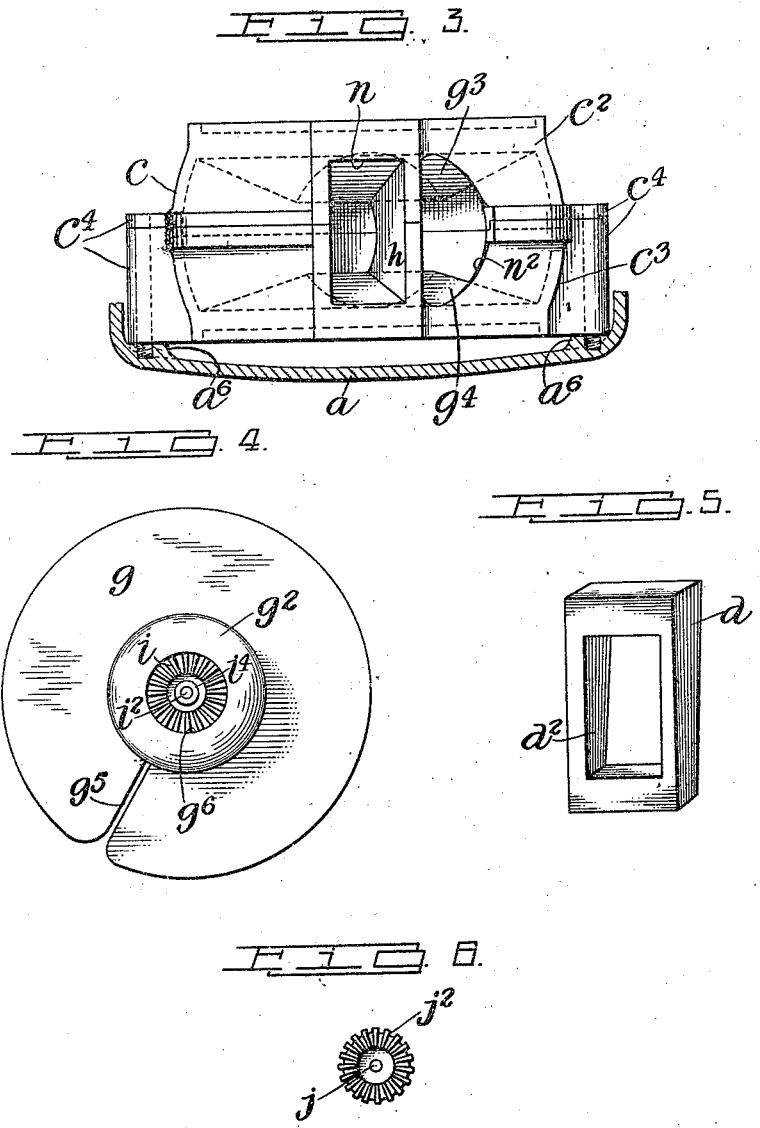

UNITED STATES PATENT OFFICE.

JAMES A. JERNSTEDT, OF JERSEY CITY, NEW JERSEY.

WATER-METER.

1,201,303.  Specification of Letters Patent.  Patented Oct. 17, 1916.

Application filed February 18, 1916.  Serial No. 79,018.

*To all whom it may concern:*

Be it known that I, JAMES A. JERNSTEDT, a citizen of the United States, and residing at Jersey City, in the county of Hudson and State of New Jersey, have invented certain new and useful Improvements in Water-Meters, of which the following is a specification, such as will enable those skilled in the art to which it appertains to make and use the same.

This invention relates to water meters and particularly to devices of this class known in the art as piston disk meters, and the object of the invention is to provide improved means for reducing the speed of the operation of the piston disk in transmitting it to the registering mechanism, and to render the meter more regular and exact in its operation; and with this and other objects in view the invention consists in a meter of the class specified, constructed as hereinafter described and claimed.

The invention is fully disclosed in the following specification, of which the accompanying drawings form a part, in which the separate parts of my improvement are designated by suitable reference characters in each of the views, and in which:—

Figure 1 is a central vertical section of my improved meter taken through the inlet and outlet ports or passages; Fig. 2 a partial horizontal section on the line 2—2 of Fig. 1 with parts of the construction broken away; Fig. 3 a view looking at the outlet side of the inner supplemental casing of the meter in which the piston disk is mounted and showing a detail of the bottom part of the main casing; Fig. 4 a plan view of the piston disk which I employ; Fig. 5 a perspective view of the packing wedge which I employ; and, Fig. 6 a bottom plan view of a beveled gear which I employ in connection with the corresponding gear mounted in the piston disk, both of said gears being shown in section in Fig. 1.

The main casing, shape and form of my improved meter are approximately similar to other meters of this class, and said main casing comprises a main bottom part $a$ and a detachable top part $a^2$, and the main bottom part $a$ is provided at one side with an inlet pipe connection $a^3$ and at the opposite side with an outlet pipe connection $a^4$. Just inwardly of the inlet pipe connection $a^3$ is placed a screen or strainer $b$ which extends into the top part of the casing, and within the main bottom part of the casing is placed a detachable supplemental piston disk casing $c$ composed of detachable top and bottom parts $c^2$ and $c^3$, and between the piston disk casing and the outlet pipe connection is placed a wedge-shaped packing $d$ having an opening $d^2$ which corresponds with the discharge opening of the piston disk casing $c$.

The bottom part $a$ of the main casing is provided with raised lugs or projections $a^5$ on which the supplemental piston disk casing $c$ rests, and with raised bosses $a^6$, and the top and bottom parts of said supplemental casing are provided with laterally extending bosses $c^4$ and screws $c^5$ are passed downwardly through the bosses $c^4$ and into the bosses $a^6$ to secure the supplemental casing $c$ to the main casing of the meter, and the bottom and top parts of the main casing are provided where they abut with projecting ears $a^7$ through which are passed bolts or screws $a^8$ to connect the separate parts of said main casing. Countersunk in the top part of the supplemental inner casing $c$ is an annular band $e$ having a raised transverse frame member $e^2$ and secured to the top part of the supplemental casing $c$ by screws $e^3$, and the top part $a^2$ of the main casing is provided with a raised portion $a^9$ forming a chamber $a^{10}$ having a bottom $a^{11}$, and on which the registering mechanism is mounted, said registering mechanism being contained in a detachable casing $f$ and being of the usual construction and forming no part of my invention, and all the parts hereinbefore described with the exception of the wedge $d$ are of old and well known construction and similar to that employed in what is known as the Worthington disk meter and form no part of my invention.

The piston disk $g$ which is mounted in the central supplemental casing $c$ is provided with a central ball member $g^2$ mounted in top and bottom bearings $g^3$ and $g^4$ which are arc-shaped in cross section and formed integrally with the top and bottom parts of said casing $c$. The piston disk $g$ is shown detached in Fig. 4 and is provided at one side with a slot $g^5$ the same as other devices of this class, and the casing $c$ is provided at one side of the discharge outlet $a^4$ with the usual radial web plate $h$ which fits in said slot.

The parts $g^2$, $g^3$ and $g^4$ form a ball and socket joint and the ball member $g^2$ formed in connection with the piston disk $g$ is provided in the top thereof with a chamber $g^6$ in the bottom of which is secured a beveled gear $i$. The gear $i$ is held in place by a radial pin or bolt $i^2$ provided at its outer end with a countersunk head or nut $i^3$, the inner end of which passes centrally through the gear $i$ and which is provided with a collar or nut $i^4$ countersunk in the center of the gear $i$, and the inner end of the pin or bolt $i^2$ projects and is provided with a tapered or conical point $i^5$.

The parts $e$ and $e^2$ form a partial support for a train of gears that transmits the motion of the piston disk $g$ to the registering apparatus in the box or casing $f$, and mounted centrally or vertically in the part $e^2$ is a shaft $j$ the inner end of which is beveled or conical in form and bears on one side of the beveled or conical point of the pin or bolt $i^2$ and said shaft is provided at its inner end with a beveled gear $j^2$ which meshes with the beveled gear and the teeth on the beveled gear $j^2$ in the construction shown are one less in number than the teeth on the beveled gear $i$. The shaft $j$ is also provided above the supplemental inner casing $c$ with a pinion $k$ which meshes with a horizontally arranged gear $k^2$, the shaft of which is provided at its upper end with a pinion $k^3$ which meshes with a gear $k^4$ on the upper end of the shaft $j$.

Mounted in and centrally of the chamber $a^{10}$ and passing through the top part $a^2$ of the main casing is a shaft $m$ which passes through a stuffing box device $m^2$ and is provided at its upper end with a gear $m^3$ which meshes with a corresponding gear $m^4$, the shaft $m^5$ of which passes into the casing $f$ and operates the registering mechanism therein in the usual manner, and the lower end of the shaft $m$ is provided with a finger $m^6$ which operates in an aperture $m^7$ in the gear $k^4$.

The gear $j^2$ on the lower end of the shaft $j$ has a less number of teeth than the gear $i$ in the central ball member of the piston disk $g$, and in the construction shown the gear $j^2$ has nineteen teeth, while the gear $i$ has twenty, and with this construction nineteen movements of the piston disk $g$ will give the shaft $j$ one complete rotation and with the arrangement of the train of gears shown and described each revolution of the shaft $j$ will give the shaft $m^5$ which operates the registering mechanism one-sixteenth of a revolution.

The outlet $n$ of the inner casing $c$ is rectangular in form, in the construction shown, as indicated in Fig. 3, and is at one side of the radial web plate $h$ while the inlet $n^2$ of the casing $c$ is at the opposite side of said web plate, and in the operation of this meter, as in other meters of its class, the water enters the main outer casing as indicated by the arrow $x$ in Fig. 2, and passes around and beneath the inner casing $c^3$ and into said inner casing, as indicated by the arrow $x^2$, and after passing through or around said inner casing it leaves both the inner and the outer casing as indicated by the arrow $x^3$.

The piston disk $g$ as in other meters of this class has only a rocking and wave-like movement, its rotation being prevented by the web plate $h$, and the rocking and wave-like movement of the piston disk is transmitted through the gear $i$ to the gear $j^2$ on the gear shaft $j$, said gear $i$ being held stationary by the piston disk shaft $i^2$, and at each nineteen movements of the piston disk, with the construction shown and described, the gear shaft $j$ makes one complete revolution, and this operation of the gears $i$ and $j^2$ is facilitated by the conical bearings at the adjacent ends of the shafts $i^2$ and $j$. The rotation of the shaft $j$ is thus much reduced and by means of the intermediate gearing which connects said shaft with the registering mechanism, as hereinbefore described, the speed of the operation of the shaft $j$ is again much reduced, as hereinbefore described, in its transmission to the registering mechanism. It will be observed that, as in other meters of this class, the disk shaft $i^2$, and the gear shaft $j$ are not in the same line but are mounted at an angle one to the other, and my invention is not limited to the exact number of the teeth on the gears $i$ and $j^2$ therein shown and described, nor to the exact form and dimensions of the intermediate train of gears for transmitting the movement of the shaft $j$ to the registering mechanism, the principal features of my invention being in the method herein employed for reducing the speed of the shaft $j$ as compared with the speed of operation with the disk $g$ and in the reduction of the speed of the shaft $j$ in transmitting the movement of said shaft to the registering mechanism.

Having fully described my invention, what I claim as new and desire to secure by Letters Patent, is:—

1. In a meter of the class described, a rocking piston disk having a central spherical body in which is a radial chamber, a shaft passing radially through one side of said body, a beveled gear secured to said shaft within said chamber, a gear shaft passing into said chamber and provided with a beveled gear which meshes with the first named gear and the teeth of which are less in number than the teeth on said first named gear, and the adjacent ends of said shafts being beveled and in contact.

2. In a meter of the class described, a registering mechanism; a rocking piston disk having a central spherical body in which is a radial chamber, a shaft passing radially through one side of said body, a beveled gear secured to said shaft within said chamber, a gear shaft passing into said chamber and provided with a beveled gear which meshes with the first named gear and the teeth of which are less in number than the teeth on said first named gear, the adjacent ends of said shafts being beveled and in contact, and means for transmitting the movement of the gear shaft to the registering mechanism.

3. In a meter of the class described, a main outer casing having inlet and exhaust ports at the opposite sides, a central piston disk casing mounted in the main outer casing and provided with an outlet port which corresponds with the outlet port of the main outer casing, a rocking piston disk mounted in said piston disk casing and having a central spherical body in which is a radial chamber, a shaft passing radially through one side of said body, a beveled gear secured to said shaft within said chamber, a gear shaft passing into said chamber and provided with a beveled gear which meshes with the first named gear and a ported packing wedge inserted between the outlets of said main outer and piston disk casings to form a water-tight connection therebetween.

4. In a meter of the class described, a main outer casing having inlet and exhaust ports at the opposite sides, a central piston disk casing mounted in the main outer casing and provided with an outlet port which corresponds with the outlet port of the main outer casing, a rocking piston disk mounted in said piston disk casing and having a central spherical body in which is a radial chamber, a shaft passing radially through one side of said body, a beveled gear secured to said shaft within said chamber, and a gear shaft passing into said chamber and provided with a beveled gear which meshes with the first named gear, the teeth of one of said gears being less in number than those of the other and the adjacent ends of said shafts being beveled and in contact, and a ported packing wedge inserted between the outlets of said main outer and piston disk casings to form a water-tight connection therebetween.

In testimony that I claim the foregoing as my invention I have signed my name in presence of the subscribing witnesses this 16th day of February, 1916.

JAMES A. JERNSTEDT.

Witnesses:
C. MULREANY,
H. E. THOMPSON.